Figure 1:
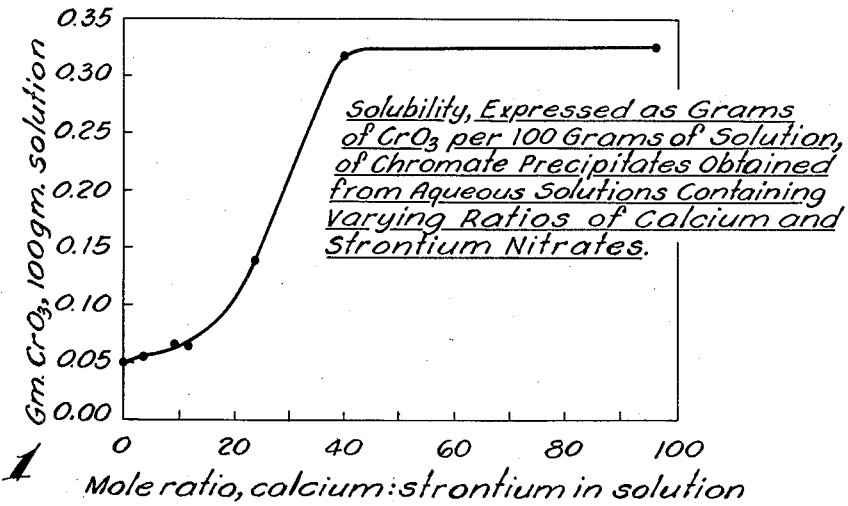

Dec. 25, 1962   R. D. GOODENOUGH ET AL   3,070,456
CHROMATE PIGMENTS
Filed Sept. 29, 1960

INVENTORS.
Robert D. Goodenough
Vernon A. Stenger

BY C.W. Carlin

ATTORNEY

3,070,456
CHROMATE PIGMENTS
Robert D. Goodenough and Vernon A. Stenger, Midland, Mich., assignors to The Dow Chemical Company, Midland, Mich., a corporation of Delaware
Filed Sept. 29, 1960, Ser. No. 59,390
1 Claim. (Cl. 106—302)

The invention concerns a new composition of matter, and the method of production thereof, from an aqueous solution containing calcium and strontium, by addition of chromate ions, e.g. by admixing a soluble chromate with a brine containing halides and/or nitrates of both calcium and strontium.

The new composition prepared in accordance with the invention has unique properties which render it broadly useful as a chromate pigment of unusually good reflectance, low water-solubility and high chromate content, which when applied to surfaces imparts thereto high luster and protection against corrosion, unaccompanied by "bleeding."

The composition of the invention is a solid solution wherein calcium atoms are present in the lattice of the crystalline structure of $SrCrO_4$, i.e. some of the strontium atoms normally present in $SrCrO_4$ are replaced by calcium atoms. The structure hereinafter will usually be referred to as $(Sr, Ca)CrO_4$. The composition of the invention is not to be confused with a mechanical or physical mixture of $CaCrO_4$ and $SrCrO_4$.

The method of preparing the composition of the invention and the composition so prepared are made clear in the ensuing description and are defined in the appended claim.

The composition of the invention is prepared by admixing a water soluble chromate or dichromate and a water-soluble hydroxide, with an aqueous solution containing soluble salts of both calcium and strontium and preferably containing a halide or nitrate of both calcium and strontium wherein the molar ratio of calcium:strontium does not exceed 20. It is preferred that the molar ratio be at least 2. Best results are obtained when the Ca:Sr molar ratio is about 12. The strontium content is between 0.2 and 5.0 percent and preferably between 0.5 and 2.0 percent by weight of the aqueous solution. The admixture should be maintained at a temperature of between 25° and 110° C. and preferably between about 90° and 110° C. while being mildly agitated for at least 0.25 hour and preferably for from 1 to 2 hours, during which crystallization of the product occurs. The product is subsequently separated from the mother liquor by known means, e.g. decantation, filtration, or centrifugation. The aqueous solution may be any suitable saline solution including natural brines, synthetic brines, such brines diluted, or concentrated, or previously employed as a source of mineral so long as soluble calcium and strontium salts remain therein as required.

Although any water-soluble chromate or water-soluble dichromate and a water-soluble hydroxide may be used as the source of the chromate ions, either $Na_2CrO_4$ or $Na_2Cr_2O_7$ and NaOH (which react to yield $Na_2CrO_4$) are usually employed. When the dichromate and the hydroxide are employed to produce $Na_2CrO_4$, they may be admixed externally, i.e., in a separate container and the resulting reaction mixture admixed with the aqueous solution of halides and/or nitrates of calcium and strontium or they may each be added directly to the aqueous solution whereby the $Na_2CrO_4$ is produced in situ. It is preferred that they be admixed externally, and thereafter the reaction product so formed added to the aqueous solution. The amount of the chromate ion employed in the practice of the invention is usually between about 60 percent and 120 percent of the amount required to react with the strontium ions present in the aqueous solution.

A particular advantage of the invention is that the brine employed for the production of the $(Sr, Ca)CrO_4$ is usually the leach liquor, sometimes called leachate or leachate brine, produced in the process of separating constituents from natural inland brines containing alkali metal and alkaline earth metal halides in solution. The leachate brine employed in the examples of the invention, hereinafter set forth, was prepared as follows: an inland brine was concentrated in an evaporator to a point at which most of the NaCl crystallized out of solution. The mother liquor thus produced, designated herein mother liquor number 1, had the specific gravity and contained the salts, for which analyses were run, set out hereinafter in Table I.

Mother liquor number 1 was further evaporated and cooled to 70° C. during which more NaCl and some tachydrite, $2MgCl_2 \cdot CaCl_2 \cdot 12H_2O$, crystallized out leaving $SrCl_2$, KCl, and a substantial percentage of the $CaCl_2$ and $MgCl_2$ in solution. The crystallized material was then separated by settling, thereby producing a second mother liquor which is designated herein mother liquor number 2. The specific gravity and percentages of salts for which analyses were run on mother liquor number 2 are also set out hereinafter in Table I.

Mother liquor number 2 was then cooled to 28.5° C. at which temperature carnallite, $KCl \cdot MgCl_2 \cdot 6H_2O$, crystallized out with a substantial portion of the $SrCl_2$. Carnallite crystallizes out to some extent between 93° and 0° C., but for practical purposes the range may be said to be between 65° and 25° C. The recommended range for crystallizing out the carnallite is between 25° and 32° C. because below about 24.8° C., $CaCl_2 \cdot 6H_2O$ begins to crystallize out.

The carnallite crystals containing the $SrCl_2$ were then washed with water, whereby much of the $SrCl_2$ and other water-soluble salts were dissolved and removed. The aqueous solution so formed is herein referred to, as aforesuggested, as leachate or leachate brine. The leachate had the specific gravity and contained the salts, for which analyses were made, in the percentages set out hereinafter under Table I. A portion of the leachate was recycled back into the process (for practical purposes and is unrelated to the instant invention) but a substantial portion thereof, heretofore largely discarded by known methods of producing carnallite, and other salts recoverable from brines by known methods, was employed herein as the brine source of strontium for the preparation of the $(Sr, Ca)CrO_4$ according to the invention. It had a calcium to strontium molar ratio of 2.7.

Table I
BRINE ANALYSES, PERCENT BY WEIGHT

|  | Mother liquor No. 1 | Mother liquor No. 2 | Leachate brine |
|---|---|---|---|
| Specific gravity | 1.411 at 95° C | 1.485 at 70° C | 1.265 at 30° C. |
| $CaCl_2$ | 34.88 | 38.92 | 3.65. |
| $MgCl_2$ | 6.12 | 7.96 | 17.05. |
| KCl | 2.53 | 3.33 | 5.07. |
| NaCl | 1.25 | 0.85 | 2.31. |
| $SrCl_2$ | 0.75 | About 0.90 | 1.95. |

The examples set out below are illustrative of the practice of the invention.

EXAMPLE 1

A 400-milliliter portion of leachate (514 grams), having a specific gravity of 1.269 and containing 2.55 percent by weight $SrCl_2$ and 4.8 percent by weight $CaCl_2$, was heated to 105° C. 63.8 milliliters of a 15 percent by weight aqueous solution of $Na_2CrO_4$, weighing 72.3 grams and containing 10.88 grams of $Na_2CrO_4$ were added to the brine, accompanied by vigorous agitation. The chromate addition was equivalent to 80 percent of the contained strontium in the aqueous solution. The chromate slurry was stirred for 2 hours at a controlled temperature of between 95° and 105° C. during which a precipitate formed. The precipitate thus formed was then separated from the mother liquor by filtering through a Buchner funnel and washed with 100 milliliters of hot water. The washed precipitate was dried at between 130° and 140° C. Analyses for Ca, Sr, and $CrO_4$ were run on the thus dried product and showed the following results in percent by weight:

| Percent Sr | Percent Ca | Percent $CrO_4$ |
|---|---|---|
| 40.41 | 1.61 | 58.14 |

The deviation from 100 percent is thought to be due to the difficulty of determining strontium and calcium exactly. The $CrO_4$, found by determination to be 58.14, is equivalent to 50.2 percent of $CrO_3$ by weight.

The lattice structure of the crystalline product so made was studied by X-ray diffraction technique. The results are set out in Table II, infra. X-ray diffraction examination showed the lattice structure of the above material to be contracted somewhat from the normal structure of pure strontium chromate, but the structure of pure calcium chromate was absent.

EXAMPLE 2

Example 1 was repeated except that the process was made continuous for a period of about 7 hours and the quantities taken were larger. The procedure consisted essentially of feeding the brine containing $SrCl_2$ and $CaCl_2$ and a 20 percent aqueous solution of $Na_2CrO_4$ into a precipitator provided with a heating, stirring, and overflow means. The average residence or dwell time in the precipitator was about 1 hour. The temperature was maintained at between 95° and 105° C., accompanied by continuous agitation, during which slurry overflowed from the precipitator.

The slurry from the overflow of the precipitator was run into a Dorr tank (which is equipped with an underflow means) where it was subjected to mild agitation for an average time of about 45 minutes during which the slurry underwent thickening. No additional heat was provided in the Dorr tank.

A thickened underflow was drawn from the Dorr tank into a trough provided with a filter medium and a suction means associated with the filter means so that the total solids of the cake thus being produced were increased. The cake was then washed with water, the ratio of water to the solids being 3 by volume. The solids were then removed from the filter and dried at between 100° and 200° C. The product formed was analyzed and found to consist of 38.2 percent Sr, 2.80 percent Ca, and 58.7 percent $CrO_4$, balance undetermined. The equivalent $CrO_3$ content is 50.6 percent. The product thus made was subjected to X-ray diffraction analysis as in Example 1 and found to consist of the solid solution of $$(Sr, Ca)CrO_4$$

as in Example 1. Details of the X-ray diffraction analysis are set forth in Table II, infra.

Two substantially pure chromate compounds and four physical mixtures thereof, designated samples H to G, were then made, as described below, for comparative purposes and subjected to X-ray diffraction analysis:

Sample A consisted of substantially pure $SrCrO_4$.

Sample B consisted of substantially pure $CaCrO_4$.

Sample C consisted of a physical mixture of 95 percent $SrCrO_4$ and 5 percent $CaCrO_4$ by weight.

Sample D consisted of a physical mixture of 90 percent $SrCrO_4$ and 10 percent $CaCrO_4$ by weight.

Sample E consisted of a physical mixture of 85 percent $SrCrO_4$ and 15 percent $CaCrO_4$ by weight.

Sample F consisted of a physical mixture of 80 percent $SrCrO_4$ and 20 percent $CaCrO_4$ by weight.

Sample G consisted of $SrCrO_4$ prepared by purification of the $(Sr, Ca)CrO_4$ produced in Example 1. In the purification process, calcium was removed from the lattice by admixing the $(Sr, Ca)CrO_4$ with a 3 normal solution of hydrochloric acid, together with a small amount of $SrCl_2$ in an amount substantially sufficient to equal the stoichiometric quantity required to react with the calcium chromate present, and thereafter neutralizing by adding an aqueous solution of sodium hydroxide thereto and agitating at about 100° C. for 60 minutes. A precipitate was formed thereby which was removed by filtration and dried at between 130° and 140° C. The recovered precipitate was substantially pure $SrCrO_4$. The X-ray diffraction results obtained for the comparative samples are set out in Table II below.

Table II

| Run designation | Material tested | Significant results in X-ray diffraction pattern |
|---|---|---|
| Examples of invention: | | |
| 1 | $(Sr, Ca)CrO_4$ | Strongest line in the back-reflection region at 0.911A. |
| 2 | $(Sr, Ca)CrO_4$ | $SrCrO_4$ (contracted more than Example 1). Strongest line in the back-reflection region at 0.910A. |
| Comparative samples: | | |
| A | Substantially pure $SrCrO_4$ | Strongest line in the back-reflection region at 0.914A. |
| B | Substantially pure $CaCrO_4$ | 3.62A, strongest line of the total pattern of $CaCrO_4$. No back-reflection region line at 0.914A. |
| C | 95% $SrCrO_4$, 5% $CaCrO_4$[a] | Strongest line of $CaCrO_4$ was detectable in Run C. This line became stronger as the percent $CaCrO_4$ increased and other lines appeared at the higher percentages of $CaCrO_4$. No change in the $SrCrO_4$ pattern from the standard could be detected with increasing $CaCrO_4$. |
| D | 90% $SrCrO_4$, 10% $CaCrO_4$[a] | |
| E | 85% $SrCrO_4$, 15% $CaCrO_4$[a] | |
| F | 80% $SrCrO_4$, 20% $CaCrO_4$[a] | |
| G | $SrCrO_4$ prepared from $(Sr, Ca)CrO_4$ of Example 1 by replacement of calcium with strontium. | Same as pure sample of $SrCrO_4$. Strongest line in back-reflection region at 0.914A. |

[a] A physical mixture having the indicated percentage composition.

A comparison of the X-ray diffraction pattern of the composition prepared in accordance with the invention, by a batch process, i.e. Example 1, and by a continuous process, i.e. Example 2, on the one hand, and the patterns of pure $SrCO_4$, of $CaCrO_4$, or of physical mixtures of $SrCrO_4$ and $CaCrO_4$, as illustrated by samples A to G, on the other hand, shows that the strong identifying line in the X-ray diffraction pattern was of a shorter wave length for the examples than for the comparative samples. In terminology of X-ray diffraction personnel, there was a displacement toward the right in the examples of the invention when compared to the comparative samples. Such displacement is toward a smaller $d$ value in Bragg's equation: $\lambda = 2d\theta$, where $d$ is defined as the interplanar spacing between faces of a family of planes in a crystal. It is known that the amount of this displacement is proportional to the extent of contraction of the crystals and, therefore, of the amount of the atoms of the smaller sized element present in the solid solution being tested. It is also known that calcium has a smaller atom radius than strontium, the ionic radius of strontium being 1.13 Angstrom units and that of calcium being 0.97 Angstrom unit.

The solubilities in water of the dried products formed in Examples 1 and 2 and comparative samples A–F were ascertained as follows: 100 grams of water at 26.3° C. were saturated with the product and the solution was then analyzed to determine the $CrO_3$ content. The solubility values thus obtained are set out in Table III, infra. No value was obtained for the product of sample G since it was substantially the same as that of sample A.

Values indicative of the light-reflectance properties of the dried precipitates were also obtained. The use of a recording spectrophotometer to determine spectral reflectance curves is well known in the pigment industry, magnesium oxide (MgO) generally being used as a standard which is defined as showing 100 percent reflectance in the visual region of the spectrum (The Chemistry and Physics of Organic Pigments, by L. S. Pratt, published by John Wiley and Sons, Inc., New York, 1947, pp. 299–301; Physical and Chemical Examination of Paints, Varnishes, Lacquers, and Colors, by H. A. Gardner and G. G. Sward, 11th edition, 1950, published by the Gardner Laboratory, Inc., Bethesda, Maryland, pp. 66–68, 92). Ordinarily the results of a spectrophotometric examination are plotted as the curve of percent reflectance as ordinates versus wavelength as abscissae. Various pigments show widely different spectra so that the curves usually must be inspected rather than described, to be meaningful. However, we have observed that the curves for strontium chromate and calcium chromate are quite similar to the curve for pure lead chromate (chrome yellow). This curve shows complete absorption (zero reflectance) of light below a given wavelength, above which the reflectance rises slowly at first and then rises quite steeply through the point of equal absorption and reflection (50 percent reflectance) until finally it approaches the line of complete reflectance (zero absorbance) asymptotically. A typical reflectance curve for chrome yellow is shown by V. C. Vesce (Protective and Decorative Coatings, edited by J. J. Mattielo, 1st edition, 1946, published by John Wiley and Sons, New York, volume V, p. 443). We have also observed that the curve for calcium chromate is displaced from that for strontium chromate in the direction of increasing wavelength, though the two curves, in general, run somewhat parallel. Thus the curve for pure strontium chromate passes through the point of 50 percent reflectance at a wavelength of 482–484 millimicrons (m$\mu$) whereas the curve for pure calcium chromate passes through its point of 50 percent reflectance at 515–518 m$\mu$. In other words, the calcium chromate absorbs more of the light below 515 m$\mu$, so that the light which it reflects, above this wavelength, contains a smaller proportion of blue and green light and hence the calcium chromate has a somewhat darker, more reddish tone. This property is related to the increased weight percentage of chromate radical in the calcium chromate as compared with strontium chromate, and the color intensities (reflectances) of the two pigments have a corresponding relationship. It is convenient, then, to compare the reflectance properties of these products in terms of the wavelengths at which the respective curves pass through the points of 50 percent reflectance ($\lambda$ 50%). The results are set out in Table III, infra.

*Table III*

PROPERTIES OF VARIOUS PRODUCTS

| | Percent Ca | Percent Sr | Percent CrO$_4$ | Wavelength $\lambda$50 [1] | Solubility [2] |
|---|---|---|---|---|---|
| Examples of the invention: | | | | | |
| 1 | 1.61 | 40.4 | 58.1 | 490 | 0.057 |
| 2 | 2.83 | 38.2 | 58.7 | 512 | 0.075 |
| Comparative samples: | | | | | |
| A | | 42.8 | 56.7 | 484 | 0.056 |
| B | 25.2 | | 72.9 | 518 | 0.92 |
| C | 1.30 | 40.8 | 57.8 | 485 | 0.30 |
| D | 2.58 | 38.7 | 58.7 | 486 | 0.46 |
| E | 3.90 | 36.2 | 59.2 | 487 | 0.73 |
| F | 5.16 | 34.2 | 60.2 | 488 | 0.70 |

[1] Expressed in millimicrons at 50% reflectance.
[2] Expressed in grams of CrO$_3$ per 100 grams of solution at 26.3° C.

Reference to Table III shows that the solid solution, prepared according to the invention, as illustrated by Examples 1 and 2, has a water solubility substantially as low as that of pure strontium chromate, as shown by comparative sample A. The water solubilities of Examples 1 and 2 are clearly in contrast to the water solubility of pure calcium chromate and, to a lesser but still marked extent, to the water solubilities of the physical mixtures of strontium chromate and calcium chromate as shown by comparative samples C to F.

The reflectance data of Table III show that the products made according to the invention, as illustrated by Examples 1 and 2, have reflectance values ($\lambda$ 50%) differing from that of pure strontium chromate and approaching that of calcium chromate. The differences are much more marked in the products containing both calcium atoms and strontium atoms in the crystals than in any of the physical mixtures of calcium chromate and strontium chromate. Although the $\lambda$ 50% values of Examples 1 and 2 are not so great as that of pure calcium chromate, as illustrated by comparative run B, the latter is not a satisfactory pigment because of its high water solubility, resulting in extensive bleeding when in use.

Eight additional test runs were made employing brines having varying mole ratios of calcium to strontium, present as $Ca(NO_3)_2$ and $Sr(NO_3)_2$. The test runs were conducted as follows: synthetic brine was prepared by admixing sufficient amounts of $Ca(NO_3)_2$ and $Sr(NO_3)_2$ in an aqueous solution to make the ratio of calcium to strontium desired for each specific test. Into this synthetic nitrate brine was run a sufficient amount of 20 percent by weight $Na_2CrO_4$ solution to provide nearly the stoichiometric quantity required to react with the strontium present in the brine. Whether or not more or less than the stoichiometric quantity of either of the reactants is employed is controlled by economic considerations chiefly that of whether a high recovery of chromate or a high recovery of strontium is more desirable. When, as here, less than the stoichiometric quantity of chromate is employed, a greater percent of the theoretical amount of the chromate and a lower percent of the strontium is recovered. The temperature of the solution containing the reacting brine and sodium chromate was maintained between 95° and 105° C. and the digestion time was 1 hour. The precipitated product formed was separated by means of a Buchner funnel and the resulting product water-washed and analyzed. The ratio of calcium to strontium in the brine solution and the analysis of the product thus made in each of the eight runs are shown in Table IV below. Those runs wherein the Ca:Sr ratio was not so great as to impart undesirable water solubility thereto and produced principally (Sr, Ca)CrO₄ are designated Examples 3 to 6. Those runs which produced substantially pure SrCrO₄ or CaCrO₄ or a product containing too high a percent of the latter are designated comparative samples H, I, J, and K.

Figure 2:
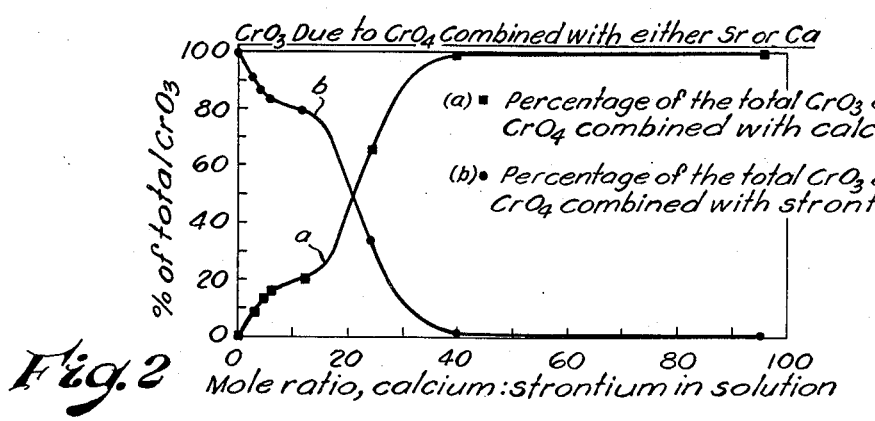
Figure 3:
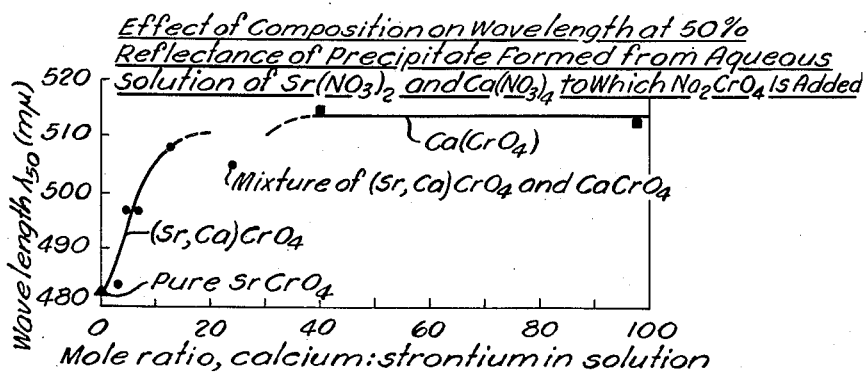

The results are also set forth in graphic form in FIGURES 1, 2 and 3, appended hereto. FIGURES 1, 2 and 3 show the relationship of a changing molar ratio of calcium to strontium in the brine employed to properties of the product made as follows: FIGURE 1 shows the relationship of such ratio to the solubility of the product made calculated as CrO₃; FIGURE 2 shows the relationship of such ratio to the percent CrO₃ due to the CrO₄ combined with each of Ca and Sr; FIGURE 3 shows the relationship of such ratio to the wavelength in millimicrons at 50 percent reflectance.

reached when the curve becomes asymptotic to the zero axis.

FIGURE 3 shows the relationship of the Ca:Sr molar ratio to the reflectance in millimicrons at 50 percent. It can be seen that the (Sr, Ca)CrO₄ product of the invention gives values of greater wavelength than that of pure SrCrO₄. It particularly shows that as the Ca:Sr ratio in the brine is increased up to about 20 (which is within the water-solubility acceptable for pigment use) the reflectance values are shifted in the direction of the reflectance value of CaCrO₄. The hiatus in the resulting curve between molar ratios of Ca:Sr of about 20 and 30 appears to represent a definite break in the absorbance of light by the precipitate formed, when soluble calcium and strontium salts are reacted with a soluble chromate in an aqueous solution. The light absorbance of the (Sr, Cr)CrO₄ (resulting in a more intense color), which occurs when the Ca:Sr ratio is increased from 2 to about 20, approaches that of pure CaCrO₄, as shown by the flat portion of the curve, without the accompanying unacceptably

*Table IV*

COMPOSITION AND CRYSTAL PHASE OF MATERIAL PREPARED FROM
Sr(NO₃)₂—Ca(NO₃)₂—Na₂CrO₄ IN AQUEOUS SOLUTIONS

|  | Comparative sample H | Examples of invention | | | | Comparative samples | | |
|---|---|---|---|---|---|---|---|---|
|  |  | 3 | 4 | 5 | 6 | I | J | K |
| Molar ratio Ca to Sr in aqueous solution. | 0/1 | 3/1 | 4.5/1 | 6/1 | 12/1 | 24/1 | 40/1 | 96/1. |
| Total percent, CrO₃ | 48.42 | 49.65 | 50.50 | 48.19 | 50.87 | 54.80 | 61.80 | 60.14. |
| Percent CrO₃ combined with Ca. | Nil | 8.50 | 13.64 | 16.07 | 20.30 | 66.50 | 99.50 | 100.00. |
| Percent CrO₃ combined with Sr. | 100 | 91.50 | 86.36 | 83.93 | 79.70 | 33.50 | 00.65 | Nil. |
| Crystal system [1] | SrCrO₄ | (Sr, Ca)CrO₄ | (Sr, Ca)CrO₄ | (Sr, Ca)CrO₄ | (Sr, Ca)CrO₄ | About equal weights (Sr, Ca)CrO₄ and CaCrO₄. | CaCrO₄ | CaCrO₄. |
| Wave length, mμ at 50% reflectance. | 482 | 484 | 497 | 497 | 508 | 505 | 515 | 513. |

[1] X-ray diffraction analysis: (Sr, Ca)CrO₄ denotes a solid solution having a contracted lattice.

An examination of Table IV shows that an increase in the molar ratio of calcium to strontium in the starting solution from 3 to 12 as illustrated by Examples 3 to 6, results in a definite increase both in the total percent of CrO₃ in the product and that due to CrO₄ combined with Ca. It also shows an increase in the color intensity, as shown by the increased wavelength values.

FIGURE 1 shows the relationship of the Ca:Sr ratio to the water-solubility of the product formed, calculated as CrO₃. It clearly shows that the product made according to the invention employing a mole ratio of Ca:Sr of up to 12 has very low water-solubility. As the ratio, thereafter, is increased to about 20, the solubility increases to about 0.11 gram of CrO₃ per 100 grams of solution. Thereafter the solubility rises sharply.

FIGURE 2 shows the relationship of the Ca:Sr molar ratio in the brine to the percentage of CrO₃ due to CrO₄ combined with strontium and the percentage of CrO₃ due to CrO₄ combined with calcium. It shows that as the Ca:Sr ratio is increased (curve a), the percentage of CrO₃ due to the CrO₄ combined with calcium rises somewhat rapidly up to about 15 percent of the CrO₃ present, levels off to some extent between about 15 percent and 20 percent when the Ca:Sr ratio is from about 5 to 12, and then rises sharply until a ratio of Ca:Sr of about 40 is reached when the curve becomes asymptotic to the theoretical 100 percent line. Conversely, as the Ca:Sr ratio is increased (curve b), the percentage of CrO₃ due to the CrO₄ combined with Sr drops somewhat rapidly from 100 to about 86 percent of the CrO₃ present, levels off to some extent when the Ca:Sr ratio is from about 5 to 12, and then drops sharply (showing about 50 percent CrO₃ from each of combined Sr and Ca when the ratio of Ca:Sr is about 22) until a ratio of about 40 is high water-solubility of CaCrO₄.

The examples set out hereinabove and the resulting product, as identified by X-ray diffraction patterns, show that calcium atoms exist in the lattice of the crystalline structure; that instead of SrCrO₄ there exists a solid solution having a general formula of (Sr, Ca)CrO₄ showing that some of the strontium ordinarily present in SrCrO₄ is replaced by some calcium resulting in a contracted crystal; and that the calcium is not present as CaCrO₄ mechanically or physically mixed with SrCrO₄.

The solubility tests of the product made, in contrast to pure SrCrO₄, pure CaCrO₄, or physical mixtures of SrCrO₄ and CaCrO₄, show that the water solubility of the (Sr, Ca)CrO₄ prepared according to the invention is very similar to that of pure SrCrO₄, although such water solubility increases slightly with an increase of the molar ratio of calcium to strontium in the brine employed, as shown by a comparison of Example 2 to Example 1.

The examples further show that the wave lengths of 50 percent reflectance, as described heretofore, of the (Sr, Ca)CrO₄ prepared according to the invention are sufficiently longer to modify the tinctorial power of films employing the composition of the invention in contrast to those employing pure SrCrO₄.

The value of the composition of the invention is that it possesses substantially the same anti-corrosion effect as pure strontium chromate pigment, but in addition thereto, has improved reflectance properties without the accompanying increased water solubility associated with mechanical mixtures of strontium chromate and calcium chromate.

Having described the invention, what is claimed and desired to be protected by Letters Patent is:

A new composition of matter consisting of a solid solution having the general formula (Sr, Ca)CrO$_4$ wherein (1) a crystalline structure is contracted as shown by X-ray diffraction patterns, from that of the crystalline structure of substantially pure SrCrO$_4$, the back-reflection strongest line in the pattern being from about 0.910 to about 0.911 Angstrom unit, (2) the special reflectance curve of the product is displaced from the average curve of SrCrO$_4$ toward that of CaCrO$_4$ such that the wavelength, at 50 percent reflectance compared with MgO as 100 percent reflectance, is at least 490 millimicrons, and (3) the water-solubility, calculated as CrO$_3$, is not more than about 0.11 gram per 100 grams of a saturated solution thereof at 26.3° C.

References Cited in the file of this patent

UNITED STATES PATENTS 2,980,502   Goodenough et al. _____ Apr. 18, 1961